J. A. BURCHARD.
Corn Planter.

No. 82,918.

Patented Oct. 13, 1868.

Witnesses:

Inventor:
John A. Burchard.

JOHN A. BURCHARD, OF BELOIT, WISCONSIN.

Letters Patent No. 82,918, dated October 13, 1868.

IMPROVEMENT IN CORN-PLANTERS.

The Schedule referred to in these Letters Patent and making part of the same.

*To all whom it may concern:*

Be it known that I, JOHN A. BURCHARD, of the city of Beloit, county of Rock, in the State of Wisconsin, have invented an Improvement in Corn-Planters; and I do hereby declare the following description and accompanying drawings are sufficient to enable any person skilled in the art or science to which it most nearly appertains, to make and use my said invention or improvements without further invention or experiment.

The nature of my invention and improvements consists in so constructing and arranging a corn-planter that the operator has in view several cells, containing seed for successive hills, and is also enabled to discover any failure to plant correctly. It is estimated by intelligent corn-raisers that one hill in twenty-five is missed by the planters now in use. By the use of my planter this loss is prevented.

For a full and complete description of my invention, reference is made to the accompanying drawings, in which—

Figure 4 is a side view of the stop-latch g.

Like letters of reference indicate like parts.

Figure 1:
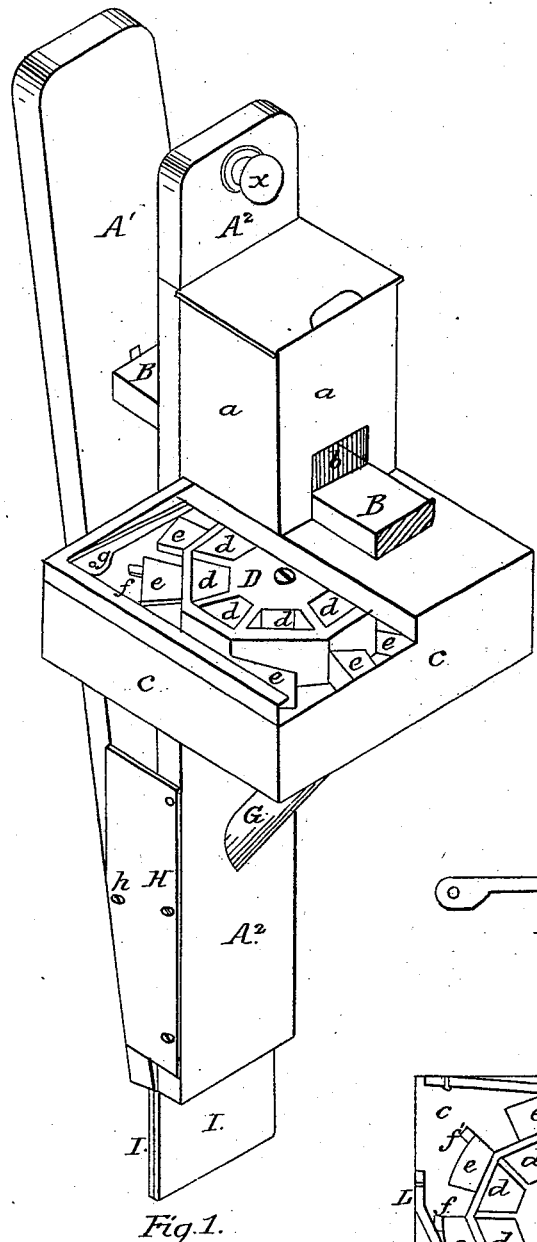
Figure 1 is a perspective view of the machine complete.
Figure 2:
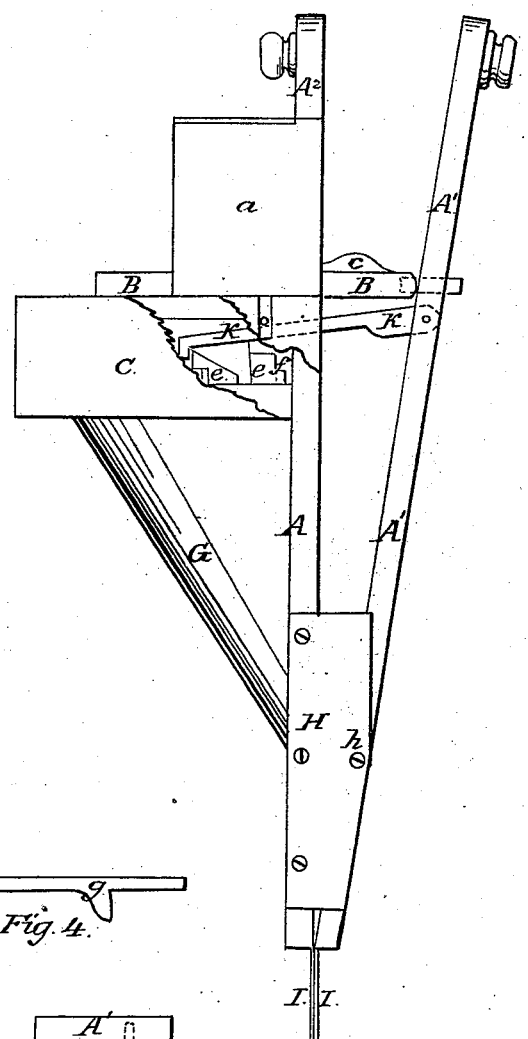
Figure 2 is a side sectional view, with a portion of the dropper-box C removed, to show the working of the pawl K, stirrer c, and feed-slide B.

A¹ A² represent the standards, by the operation of which the various parts of the machine perform their several duties.

a a represent the seed-hopper, which is provided with the cut-off brush b.

B represents the feed-slide, provided with a cavity, of sufficient size to contain seed for one hill, also having the stirrer c, for the purpose of causing the seed-cavity to fill evenly. Said slide, with stirrer, passes through the standard A², in a suitable mortise and slot, and is pivoted to the standard A¹ by a pitman.

C is the dropper-box, attached to the standard A², containing the octagonal dropper D, provided with the cells d, inclined segments e, to which are attached the stops f, also having the stop-latches g and l.

G is a spout, for conveying the seed from the dropper-box to the chamber, formed by the plates H H. The said plates are rigidly affixed to one of the standards, and pivoted to the other, as shown at h.

I I are metallic planting-points.

K is the pawl, used for rotating the dropper D; the stops g and l are for the purpose of maintaining uniform action of the dropper D.

The standards A¹ A² are constructed of strips of wood, of suitable length, width, and thickness. The dropper-box C, feed-slide B, and hopper a a, may be made of wood or metal. The pawl K, stirrer c, and stop-latches g and l, may be made of cast or sheet-metal. The dropper D is made of cast-metal. The spout G is formed of sheet-metal. The planting-points I I and plates H H may be made of cast or sheet-metal.

The open portion of the dropper-box C is covered with glass, (not shown in the drawing, but in the model,) to show the working of the dropper, and prevent the escape of seed.

The planter is operated as follows:

Fill the hopper a a with seed, grasp the handles x x, press the tops of the standards together, and the cavity of the feed-slide B, containing seed sufficient for one hill, will pass out of the hopper, until it comes vertical to one of the seed-cells of the dropper D, when the seed will pass through the mortise in the cover of the box C, into the cell d, and by the same motion, the pawl K, traversing one of the inclined segments, hooks thereto, and also lifts the stop-latch g, and disengages it from the stop f.

When the standards are moved apart, the cavity passes into the hopper a a, for seed for the next hill. The same movement also causes the pawl K to rotate the dropper D, so that the cell containing seed shall be moved, so that the cell next to it shall be placed in position to receive the next charge from the feed-slide B.

While the pawl K is rotating the dropper D the distance of one cell, the stop-latch g, by its gravity, is placed in position to engage with the stop f, thereby preventing, from a sudden stroke, the cell passing beyond its proper position. The latch l acts as a stop, to prevent the backward movement of the dropper D.

When the planter has been operated until all the cells of the dropper D have been filled, the seed from the first cell passes, through a cavity in the bottom of the dropper-box C, into the spout G, thence into the chamber formed by the plates H H; then, by placing the points I I in the ground, and moving the tops of the standards together, the seed is deposited in the ground.

Figure 3:
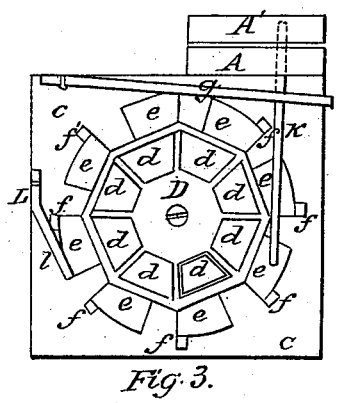
Figure 3 is a top sectional view of the octagonal rotating dropper D, pawl K, and stop-latches g and l.

This dropping-device may be used or applied to a corn or seed-planter, constructed as herein described, single or double, so as to plant two rows at the same time, or to planters operated by horse or other power. The dropper may be made with a greater or less number of cells than is shown in fig. 3.

What I claim as my invention, and desire to secure by Letters Patent, is—

1. Broadly, the employment of the dropping-device D, when constructed and arranged substantially as herein described and set forth, and used for the purpose of enabling the operator to know by ocular demonstration whether the machine is dropping the seed with certainty and accuracy.

2. In combination with the device D, the pawl K and stop-latches g and l, when used for the purpose herein set forth.

3. The combination and arrangement of the several parts of the planter herein described, when used for the purpose set forth.

JOHN A. BURCHARD.

Witnesses:
C. O. TATTERSHALL,
A. F. SPAULDING.